(12) United States Patent
Kabbani et al.

(10) Patent No.: US 9,692,639 B1
(45) Date of Patent: Jun. 27, 2017

(54) ACHIEVING FULL BANDWIDTH USAGE AND MAX-MIN FAIRNESS IN A COMPUTER NETWORK

(71) Applicant: Google Inc., Mountain View, CA (US)

(72) Inventors: Abdul Kabbani, Los Gatos, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 904 days.

(21) Appl. No.: 13/932,703

(22) Filed: Jul. 1, 2013

Related U.S. Application Data

(60) Provisional application No. 61/788,054, filed on Mar. 15, 2013.

(51) Int. Cl.
*G06F 15/177* (2006.01)
*H04L 12/24* (2006.01)

(52) U.S. Cl.
CPC ............... *H04L 41/0803* (2013.01)

(58) Field of Classification Search
CPC ....... G06F 15/177; H04L 49/10; H04L 49/15; H04L 41/08; H04L 41/12
USPC ......................................................... 709/220
See application file for complete search history.

(56) References Cited

U.S. PATENT DOCUMENTS

| | | | | |
|---|---|---|---|---|
| 4,048,672 A * | 9/1977 | Seiden | .................. | G06F 15/177 710/36 |
| 5,903,544 A * | 5/1999 | Sakamoto | ............. | H04L 49/201 370/218 |
| 7,382,787 B1 * | 6/2008 | Barnes | .................... | H04L 12/66 370/401 |
| 7,525,904 B1 * | 4/2009 | Li | ........................... | H04L 12/66 370/217 |
| 7,710,991 B1 * | 5/2010 | Li | ........................... | H04L 12/66 370/217 |
| 8,307,021 B1 * | 11/2012 | Dhanoa | ................... | G06F 17/16 708/200 |
| 8,406,128 B1 * | 3/2013 | Brar | ........................ | H04L 49/15 370/229 |
| 8,489,718 B1 * | 7/2013 | Brar | ...................... | H04L 49/356 370/254 |

(Continued)

OTHER PUBLICATIONS

Al-Fares, Mohammad, et al. A Scalable, Commodity Data Center Network Architecture, ACM SIGCOMM Computer Communication Review, vol. 38. No. 4, pp. 63-74, ACM, 2008.

(Continued)

*Primary Examiner* — Kostas Katsikis
(74) *Attorney, Agent, or Firm* — McDermott Will & Emery LLP

(57) ABSTRACT

Systems and methods of configuring a computer network are provided. A first stage having F switches and a second stage having S switches can be provided. Each switch in the first stage of switches can form M communication links with switches in the second stage of switches. Each switch in the second stage can form N communication links with switches in the first stage of switches. Communication links between respective switch pairs can be assigned. Each switch pair can include one witch in the first stage of switches and one switch in the second stage of switches. The number of communication links assigned to at least one switch pair can differ from the number of communication links assigned to at least a second switch pair.

17 Claims, 9 Drawing Sheets

(56) References Cited

U.S. PATENT DOCUMENTS

| | | | | |
|---|---|---|---|---|
| 8,554,952 B1* | 10/2013 | Brar | ................ | H04Q 3/68 370/250 |
| 9,262,372 B1* | 2/2016 | Kabbani | ................ | G06F 15/177 |
| 2004/0165887 A1* | 8/2004 | Beshai | ................ | H04L 49/10 398/42 |
| 2004/0213217 A1* | 10/2004 | Willhite | ................ | H04L 12/5693 370/380 |
| 2006/0117096 A1* | 6/2006 | Lin | ................ | H04L 49/357 709/220 |
| 2006/0117112 A1* | 6/2006 | Lin | ................ | H04L 41/0846 709/238 |
| 2007/0030845 A1* | 2/2007 | Hill | ................ | H04L 49/253 370/369 |
| 2007/0104163 A1* | 5/2007 | Kim | ................ | H04B 7/0417 370/338 |
| 2007/0104288 A1* | 5/2007 | Kim | ................ | H04B 7/0417 375/267 |
| 2007/0213013 A1* | 9/2007 | Kim | ................ | H04B 7/04 455/69 |
| 2008/0043873 A1* | 2/2008 | Ariyavisitakul | ................ | H04B 7/0617 375/267 |
| 2009/0219835 A1* | 9/2009 | Bandholz | ................ | H04L 12/462 370/255 |
| 2010/0079347 A1* | 4/2010 | Hayes | ................ | H01Q 1/246 343/705 |
| 2011/0176804 A1* | 7/2011 | Blinkert | ................ | G02B 6/356 398/45 |
| 2012/0008945 A1* | 1/2012 | Singla | ................ | H04J 14/0204 398/49 |
| 2012/0182865 A1* | 7/2012 | Andersen | ................ | H04L 1/22 370/228 |
| 2013/0077471 A1* | 3/2013 | Assarpour | ................ | H04L 41/0668 370/219 |

OTHER PUBLICATIONS

Wikipedia, Pigeonhole Principle, retrieved from URL: https://en.wikipedia.org/wiki/Pigeonhole_principle on Dec. 21, 2016.
Wikipedia, Max-min fairness, retrieved from URL: https://en.wikipedia.org/wiki/Max-min_fairness on Dec. 21, 2016.

* cited by examiner

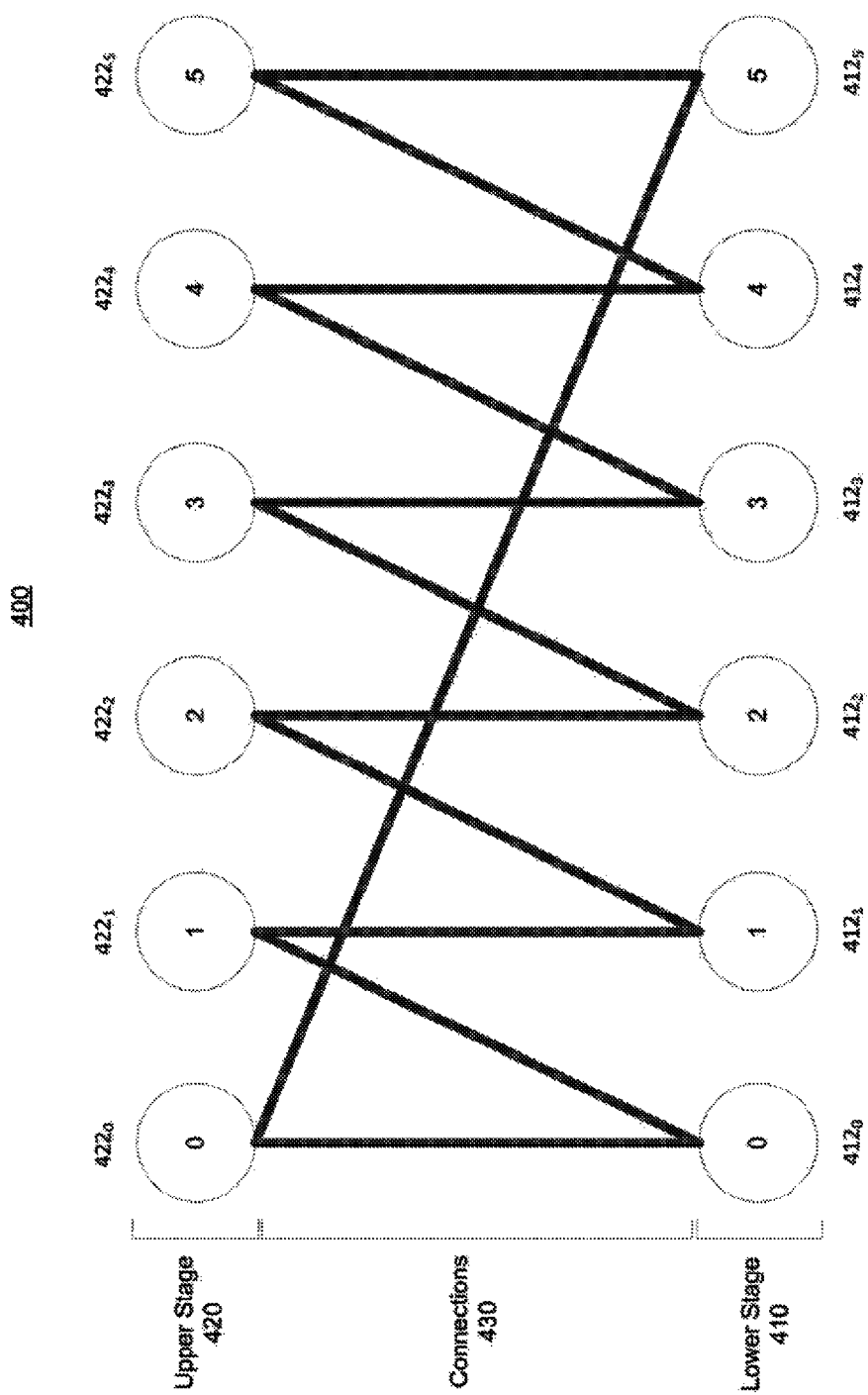

| | $412_0$ | $412_1$ | $412_2$ | $412_3$ | $412_4$ | $412_5$ |
|---|---|---|---|---|---|---|
| $422_5$ | 1 | 1 | 1 | 1 | 2 | 2 |
| $422_4$ | 1 | 1 | 1 | 2 | 2 | 1 |
| $422_3$ | 1 | 1 | 2 | 2 | 1 | 1 |
| $422_2$ | 1 | 2 | 2 | 1 | 1 | 1 |
| $422_1$ | 2 | 2 | 1 | 1 | 1 | 1 |
| $422_0$ | 2 | 1 | 1 | 1 | 1 | 2 |

| | $512_0$ | $512_1$ | $512_2$ | $512_3$ | $512_4$ | $512_5$ |
|---|---|---|---|---|---|---|
| $522_0$ | 2 | 1 | 1 | 2 | 1 | 1 |
| $522_1$ | 1 | 2 | 1 | 1 | 2 | 1 |
| $522_2$ | 1 | 1 | 2 | 1 | 1 | 2 |

ACHIEVING FULL BANDWIDTH USAGE AND MAX-MIN FAIRNESS IN A COMPUTER NETWORK

BACKGROUND

Cloud computing and its applications are effecting a qualitative shift in the way people communicate and share information. The underlying computer networks that support cloud computing can be divided into two major categories: intra-datacenter and inter-datacenter. Intra-datacenter networks interconnect the computing infrastructure (servers, disks) within the same building or among different buildings of a datacenter campus; inter-datacenter networks connect multiple datacenters distributed at different geographic locations. Many modern high-speed data links use optical transmission technologies via optical fibers for both intra- and inter-datacenter networks.

SUMMARY OF THE INVENTION

Aspects and implementations of the present disclosure are directed to systems and methods for achieving full bandwidth usage and max-min fairness in a computer network.

At least one aspect is directed to a computer-implemented method for configuring a network. The method can provide a first stage having F switches and a second stage having S switches. Each switch in the first stage of switches can form M communication links with switches in the second stage of switches. Each switch in the second stage of switches can form N communication links with switches in the first stage of switches. The method can assign a number of communication links between respective switch pairs, each switch pair including one switch in the first stage of switches and one switch in the second stage of switches such that the number of communication links assigned to at least one switch pair differs from the number of communication links assigned to at least a second switch pair.

At least one aspect is directed to a system for configuring a network. The system can include a data processing system having at least one of a hardware analysis module, a network configuration module, and a network dissemination module. The data processing system can be configured to provide a first stage having F switches and a second stage having S switches. Each switch in the first stage of switches can form M communication links with switches in the second stage of switches. Each switch in the second stage of switches can form N communication links with switches in the first stage of switches. The data processing system can be configured to assign a number of communication links between respective switch pairs, each switch pair including one switch in the first stage of switches and one switch in the second stage of switches such that the number of communication links assigned to at least one switch pair differs from the number of communication links assigned to at least a second switch pair.

At least one aspect is directed to a non-transitory computer readable storage medium having instructions encoded thereon which, when executed by a processor, cause the processor to perform a method for configuring a network. The method can provide a first stage having F switches and a second stage having S switches. Each switch in the first stage of switches can form M communication links with switches in the second stage of switches. Each switch in the second stage of switches can form N communication links with switches in the first stage of switches. The method can assign a number of communication links between respective switch pairs, each switch pair including one switch in the first stage of switches and one switch in the second stage of switches such that the number of communication links assigned to at least one switch pair differs from the number of communication links assigned to at least a second switch pair.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 4B is a simplified view of the network shown in FIG. 4A, according to an illustrative implementation.

FIG. 4C is a matrix representing the connections in the network shown in FIG. 4A, according to an illustrative implementation.

FIG. 5C is a matrix representing the connections in the network shown in FIG. 5A, according to an illustrative implementation.

DESCRIPTION OF CERTAIN ILLUSTRATIVE IMPLEMENTATIONS

Following below are more detailed descriptions of various concepts related to, and implementations of, systems and methods for achieving full bandwidth and max-min fairness in a computer network. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
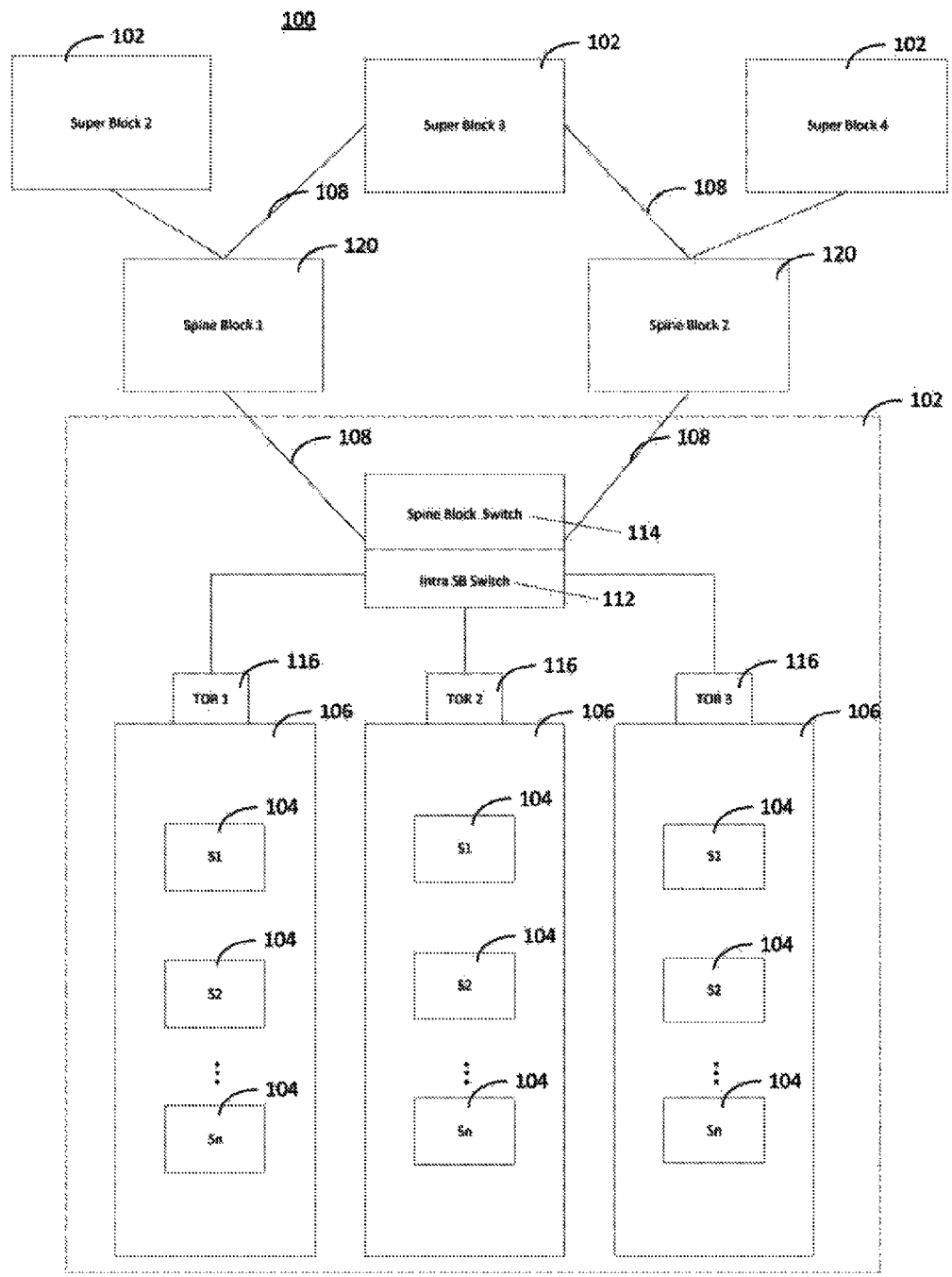
FIG. 1 is a diagram of a data center, according to an illustrative implementation.

FIG. 1 is a block diagram of an example data center 100. The data center 100 includes several interconnected superblocks 102 (also referred to as "pods"). Each superblock 102 may include many hundred, and in some implementations over one thousand, servers 104 arranged in server racks 106. The superblocks 102 are communicatively coupled to one another by optical and/or electrical communication links 108. They can be connected directly, or through spine blocks 120, which serve as switches for routing data communications between the superblocks 102. The superblock includes an intra superblock switch 112 for routing communications among the racks 106 included in the superblock 102 or to a spine block switch 114, which routes data communications between superblocks 102 through spine blocks 120. In some implementations, the spine block switch 114 can be a spine block or it can be switch within the superblock.

This disclosure primarily relates to the case in which superblocks 102 are connected only through spine blocks 120. For example, the data center 100 can be modeled as a computer network consisting of two switch stages: a first switch stage including superblocks 102, and a second switch stage including spine blocks 120. Communication between superblocks 102 is facilitated by the spine blocks 120, and there are no direct connections between any two switches in the same stage.

Fairness and throughput guarantees for communication between superblocks 102 in such a network can be made under certain practical assumptions. For example, it is assumed that each superblock 102 in the data center 100 has backlogged traffic to all of the other superblocks in the data center 100, and that each spine block 120 has backlogged traffic to all other spine blocks 120 in the data center 100. It is also assumed that each switch in the first switch stage has the same number of connections to switches in the second switch stage, and that each switch in the second switch stage has the same number of connections to switches in the first switch stage. No ports are left unused on any switch in the data center 100. However, the number of switches in the first switch stage may be different from the number of switches in the second switch stage.

Under these assumptions, a static interconnectivity scheme is disclosed that can achieve full bandwidth utilization and max-min fair throughput. Given a network shared by data flows (e.g., the backlogged superblocks 102), throughput is said to be max-min fair if no flow can increase its throughput without decreasing that of another flow whose throughput is not greater than the throughput of the first flow.

As indicated above, each superblock 102 includes a large number of servers 104. In some implementations, a superblock 102 may include hundreds or more than one thousand servers. The servers 104 are arranged in server racks 106. A top-of-rack switch 116 routes data communications between servers 104 within a given rack 106 and from servers within the rack to the intra-superblock switch 112.

Each server 104 includes at least one processor, a memory, and a network interface card (NIC), coupled to one another via a data bus. The processor executes computer executable instructions stored in the memory to implement a wide variety of applications and operations. In some implementations, the processor executes computer executable code associated with a hypervisor, also referred to as a virtual machine manager. As would be understood by a person of ordinary skill in the art, a hypervisor is an application that creates and manages virtual machines, providing the virtual machines with a virtual operating platform. The virtual machines, in turn, share the physical resources of the server 104, and execute a variety of applications in isolated environments instantiated by the hypervisor. Data communications originating from an application within a virtual machine to other physical or virtual machines are also managed by the hypervisor. The hypervisor directs communications to off-server devices or virtual machines to the NIC, which the hypervisor controls in part through a NIC driver module.

Figure 2:
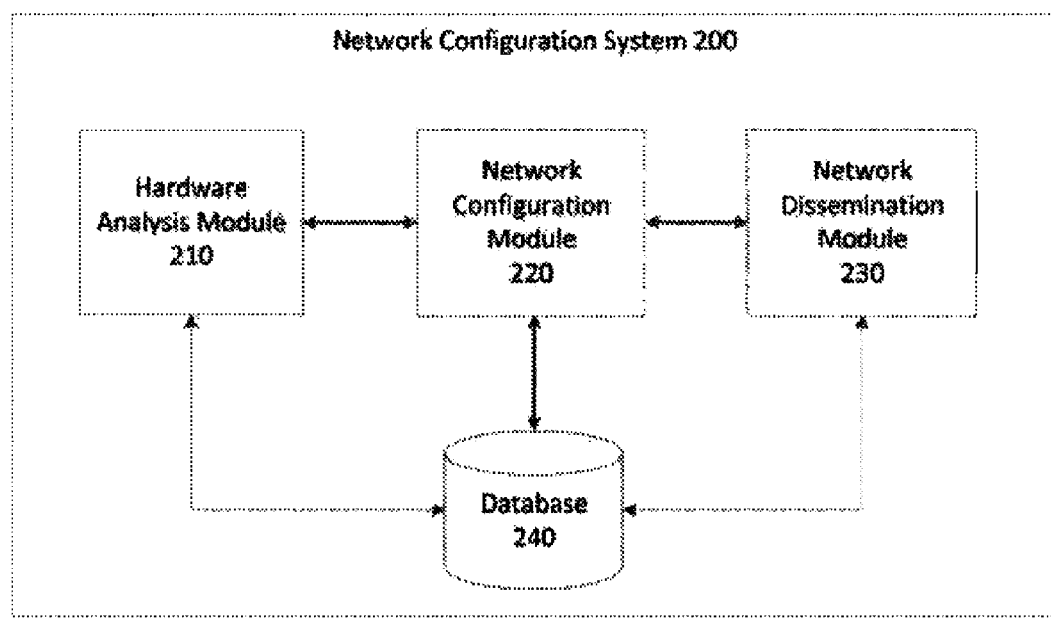
FIG. 2 is a block diagram of a network configuration system, according to an illustrative implementation.

FIG. 2 is a block diagram of a network configuration system 200, according to an illustrative implementation. The network configuration system 200 includes a hardware analysis module 210, a network configuration module 220, a network dissemination module 230, and a database 240. The components of the network configuration system 200 work to determine initial parameters of a network, generate a network configuration, and disseminate the network configuration information. The configuration generated by the system 200 can help to achieve substantially full bandwidth usage and max-min fair throughput among the nodes in the network, as discussed above. One exemplary process that can be executed by the system 200 to configure a network is shown in FIG. 3.

The components of the network configuration system 200 can be implemented by special purpose logic circuitry, e.g., an FPGA (field programmable gate array) or an ASIC (application-specific integrated circuit). The components can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. For example, the hardware analysis module 210, the network configuration module 220, the network dissemination module 230, and the database 240 can include or share one or more data processing apparatuses, computing devices, or processors.

Figure 3:
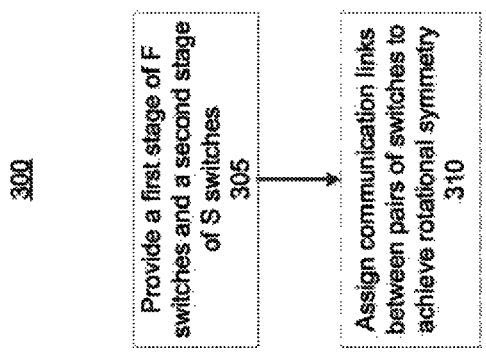
FIG. 3 is a flow diagram of a process for configuring a network, according to an illustrative implementation.

FIG. 3 is a flow diagram of a process 300 for configuring a network, according to an illustrative implementation. The process 300 includes providing a first stage of F switches and a second stage of S switches (Step 305). For example, the first stage of switches can be the set of superblocks in a data center, as described above in connection with FIG. 1, and the second stage of switches can be the set of spine blocks in the data center. In some implementations, each switch in the first stage of switches can form M communication links with switches in the second stage. Likewise, each switch in the second stage can form N communication links with switches in the first stage.

The process 300 also includes assigning communication links between pairs of switches to achieve rotational symmetry (Step 310). Each pair of switches includes one switch from the first stage and one switch from the second stage. Switches in the same stage are not directly connected in a pair.

Rotational symmetry can be achieved, for example, by assigning the links according to the following algorithm:

For i in [0 . . . F−1]
    For j in [0 . . . S−1]
        If ((j−i) % S<M % S)
            Connect the $i^{th}$ switch in the first stage to the $j^{th}$ switch in the second stage via a number of links equal to the upper bound of M/S
        Else
            Connect the $i^{th}$ switch in the first stage to the $j^{th}$ switch in the second stage via a number of links equal to the lower bound of M/S This algorithm can be implemented by the network configuration system 200 of FIG. 2. For example, the hardware analysis module 210 can determine values for the parameters F, S, M, and N to be used in the algorithm. As discussed above, the first stage of switches can include all of the superblocks in a data center, and the number F can represent the total number of superblocks to be included in the network. In some implementations, the network configuration system 200 can be a computing device located within the data center or otherwise connected to the data center. The hardware analysis module 210 determines the number of superblocks, for example, by broadcasting a request to all superblocks in the data center and determining the total number of unique responses received from superblocks. The number F can then be stored in the database 240 for later retrieval.

The hardware analysis module 210 can also assign index values i from zero to F−1 to each of the superblocks. For example, the responses from the superblocks can include information corresponding to a unique identifier for each superblock. In some implementations, the unique identifier may be a hardware address such as a MAC address or an IP address of the spine block switch within each superblock. The hardware analysis module 210 can assign a an index value i to each unique hardware address. In some implementations, the hardware analysis module 210 can assign the unique index values for each superblock based on a physical location of the superblock. For example, the hardware analysis module may assign consecutive index values to superblocks that are located near each other within the data center. Such an assignment of index values can lead to a simpler and more logically intuitive physical network configuration. The hardware analysis module can then store the index values associated with each superblock in the database 240.

Similarly, the hardware analysis module 210 can determine the value S, representing the total number of switches in the second stage. In some implementations, the second stage of switches includes the spine blocks in the data center. For example, the hardware analysis module 210 can query the spine blocks in the data center by broadcasting an identification request. The hardware analysis module 210 can determine the value for S based on the number of unique responses received from the spine blocks in response to the broadcast query. The hardware analysis module can then store the value S in the database 240.

The hardware analysis module 210 can assign an index value j to each switch in the second stage. In some implementations, the hardware analysis module 210 can assign index values based on the physical locations of the switches in the second stage (i.e., spine blocks). Physical location information can be received from the spine blocks at the hardware analysis module 210 in response to the request for identification discussed above. Alternatively, physical location information may be stored in the database 240, and the hardware analysis can retrieve the physical location information for the spine blocks from the database 240. The hardware analysis module 210 can then assign consecutive index values to adjacent spine blocks, for example. The index values for the second switch stage can then be stored in the database.

The hardware analysis module 210 can also determine the number of possible connections of each switch in the first stage (M) and the number of possible connections for each switch in the second stage (N). For example, the hardware analysis module 210 can query the switches by broadcasting a request. For example, the hardware analysis module 210 can broadcast a request for superblocks to identify the type of switches used to implement the spine block switch within each superblock. A similar request can be sent to each spine block. Based on the responses received, the hardware analysis module 210 can determine the number of possible connections for each switch. For example, switches may be identified by a manufacturer and model number, and the hardware analysis module 210 can determine the number of ports associated with each particular switch based on manufacturer descriptions. Such descriptions can be stored in the database 240, for example.

In instances where the hardware analysis module 210 is not able to communicate directly with any of the first or second stage switches, the hardware analysis module can instead determine the parameter values by retrieving them from the database 240. Alternatively, the hardware analysis module may receive configuration information for the network components as input from a human operator, and may assign parameter values as discussed above. All of the parameter values can then be stored in the database 240.

The network configuration module 220 can define the communication links between switches in the network. For example, the network configuration module 220 can perform the steps of the algorithm discussed above. In some implementations, the network configuration module can obtain the parameter values required for execution of the algorithm from the database 240, where they can be stored for example by the hardware analysis module 210. In other implementations, the network configuration module 220 can obtain the parameter values directly from the hardware analysis module 210. The network configuration module 220 then performs the steps of the algorithm to determine the network links. For example, for each switch pair including one switch from the first stage and one switch from the second stage, the network configuration module 210 can subtract the index value i of the first switch from the index value j of the second switch. The network configuration module 210 can then determine the remainder of the quotient of the difference and the number S of switches in the second stage. This remainder can then be compared to the remainder of the quotient of the number M of connections from each switch in the first stage and the number S of switches in the second stage. The network configuration module 220 can then assign a number of links for that switch pair equal to either the upper bound or the lower bound of the difference between the number M of connections from each switch in the first stage and the number S of switches in the second stage, based on the result of the comparison. The network configuration module 220 can then associate the number of links with the physical switches, based on the identification of physical switches and index values determined by the hardware analysis module 210. The resulting network configuration can be stored in the database 240.

The network dissemination module 230 can transmit the information corresponding to the determined network configuration. For example, in some implementations the switches in the network can be connected via dynamic optical links. The network dissemination module 230 can then transmit the network configuration information to a controller, which can implement the network configuration by linking the switches in the network according to the network configuration received from the network dissemination module 230. In other implementations, the network dissemination module 230 can transmit the network configuration to a human operator, for example by printing the network configuration information to a file. The human operator can then manually configure the network according to the network configuration received from the network dissemination module 230. Examples of network topologies that have been configured in accordance with the algorithm introduced above are illustrated below.

Figure 4A:
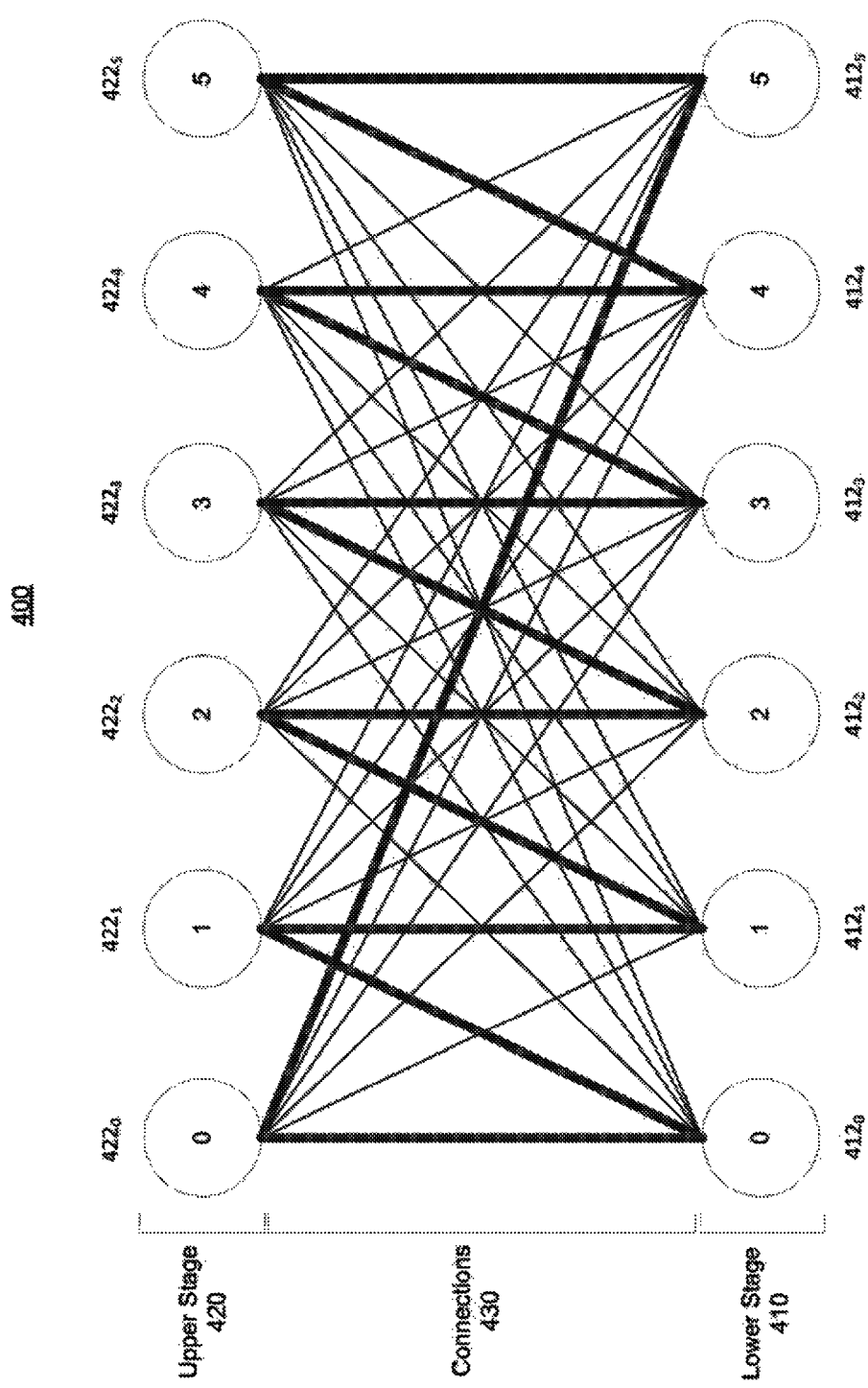
FIG. 4A is an example network configured to provide for full bandwidth and max-min fairness, according to an illustrative implementation.

FIG. 4A is an example network 400 configured to provide for full bandwidth and max-min fairness, according to an illustrative implementation. The network 400 includes a lower stage 410, and upper stage 420, and several links 430.

Each switch in the lower stage 410 and the upper stage 420 is assigned a sequential integer index value beginning from 0. The network 400 includes the same number of switches in the both the lower stage 410 and the upper stage 420: six lower stage switches $412_0$-$412_5$ and six upper stage switches $422_0$-$422_5$. Each switch in the lower stage 410 includes eight links to the switches in the upper stage 420, and each switch in the upper stage 420 includes eight links to the switches in the lower stage 410. Because there are more links from each switch than there are switches in each stage, some switch pairs are connected by more than one link. Single links are represented by a thin line, while double links are represented by a bold line.

The links in the network 400 are configured according to the algorithm introduced in connection with the description of FIGS. 2 and 3 and reproduced below:

For i in [0 . . . F−1]
    For j in [0 . . . S−1]
        If ((j−i) % S<M % S)
            Connect the $i^{th}$ switch in the first stage to the $j^{th}$ switch in the second stage via a number of links equal to the upper bound of M/S
        Else
            Connect the $i^{th}$ switch in the first stage to the $j^{th}$ switch in the second stage via a number of links equal to the lower bound of M/S In the network 400, the value of F (i.e., the number of switches in the lower stage 410) is six, the value of S (i.e., the number of switches in the upper stage 420) is six, and the value of M (i.e., number of connections from each switch in the lower stage 410 to switches in the upper stage 420) is eight. Executing the algorithm with these values produces the network configuration shown in FIG. 4A.

Each switch in the lower stage 410 is connected by at least one link to each switch in the upper stage 420. The additional links, referred to as interconnectivity slack, are distributed evenly in a rotationally symmetric fashion when allocated according to the algorithm above.

FIG. 4B is a simplified view of the network 400 shown in FIG. 4A, according to an illustrative implementation. All of the single links are removed for illustrative purposes, so that only the interconnectivity slack is visible. Each switch in the lower stage 410 is connected by two links to the switch in the upper stage having the same index and as well as the switch in the upper stage having an index value one greater than the index of the lower switch, with the exception of switch $412_5$. Because there is no switch with the index value 6 in the upper stage 420, the second double link from switch $412_5$ "wraps around" to connect to the upper switch $422_0$. The network 400 can therefore be said to exhibit rotational symmetry.

FIG. 4C is a matrix 460 representing the connections in the network 400 shown in FIG. 4A, according to an illustrative implementation. Rows in the matrix 460 correspond to index values of switches in the lower stage 410. Columns in the matrix 460 correspond to index values of switches in the upper stage 420. Each cell in the matrix has a value equal to the number of links between the switch pair represented by the row and column index values. Displaying the network 400 in the form of the square matrix 460 illustrates the rotational symmetry of the network 400.

The matrix 460 is a circulant matrix in which each row is rotated one element to the right relative to the preceding row. Furthermore, the elements in every diagonal of the matrix 460 have the same value. For example, the main diagonal consists of six elements, all of which have a value of 2. The diagonal immediately above the main diagonal also includes six elements whose with a value of 2 (note that this diagonal wraps around to include the bottom left cell of the matrix 460). All of the other diagonals include elements whose value is 1. A max-min fair throughput network will always exhibit rotational symmetry when depicted as a graph in this fashion.

Figure 5A:
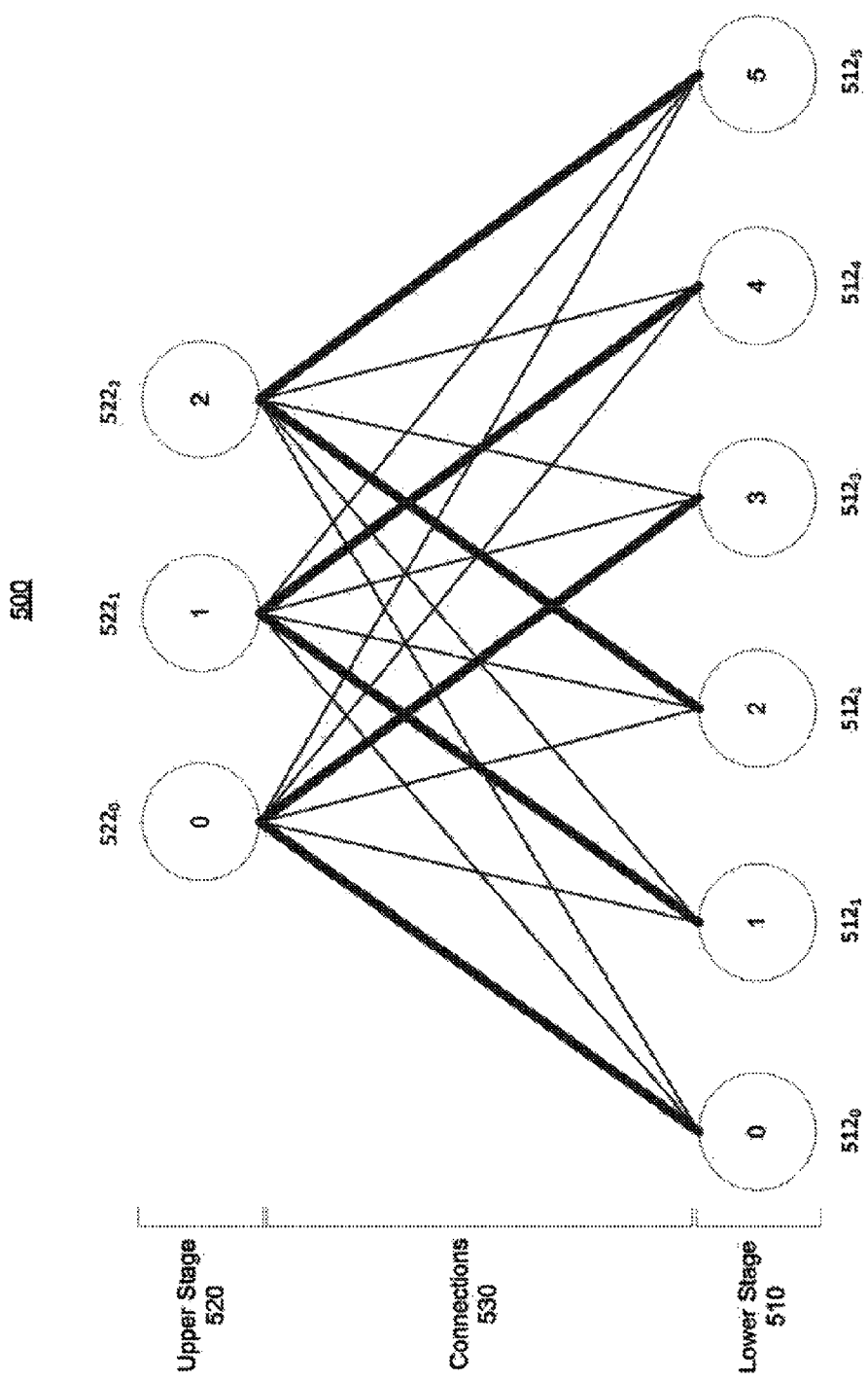
FIG. 5A is a second example network configured to provide for full bandwidth and max-min fairness, according to an illustrative implementation.

FIG. 5A is an second example network 500 configured to provide for full bandwidth and max-min fairness, according to an illustrative implementation. The network 500 includes a lower stage 510, and upper stage 520, and several links 530. Each switch in the lower stage 510 and the upper stage 520 is assigned a sequential integer index value beginning from 0. The network 500 includes a different number of switches in the lower stage 510 and the upper stage 520: six lower stage switches $512_0$-$512_5$ and three upper stage switches $522_0$-$522_2$. Each switch in the lower stage 510 includes four links to the switches in the upper stage 520, and each switch in the upper stage 520 includes eight links to the switches in the lower stage 510. Because there are more links from each switch in the upper stage 520 than there are switches in each stage, some switch pairs are connected by more than one link. Single links are represented by a thin line, while double links are represented by a bold line.

The links in the network 500 are configured according to the algorithm introduced in connection with the description of FIGS. 2 and 3 and reproduced below:

For i in [0 . . . F−1]
    For j in [0 . . . S−1]
        If ((j−i) % S<M % S)
            Connect the $i^{th}$ switch in the first stage to the $j^{th}$ switch in the second stage via a number of links equal to the upper bound of M/S
        Else
            Connect the $i^{th}$ switch in the first stage to the $j^{th}$ switch in the second stage via a number of links equal to the lower bound of M/S In the network 500, the value of F (i.e., the number of switches in the lower stage 510) is six, the value of S (i.e., the number of switches in the upper stage 520) is three, and the value of M (i.e., number of connections from each switch in the lower stage 510 to switches in the upper stage 520) is four. Executing the algorithm with these values produces the network configuration shown in FIG. 5A.

Each switch in the lower stage 510 is connected by at least one link to each switch in the upper stage 520. The additional links, referred to as interconnectivity slack, are distributed evenly in a rotationally symmetric fashion when allocated according to the algorithm above.

Figure 5B:
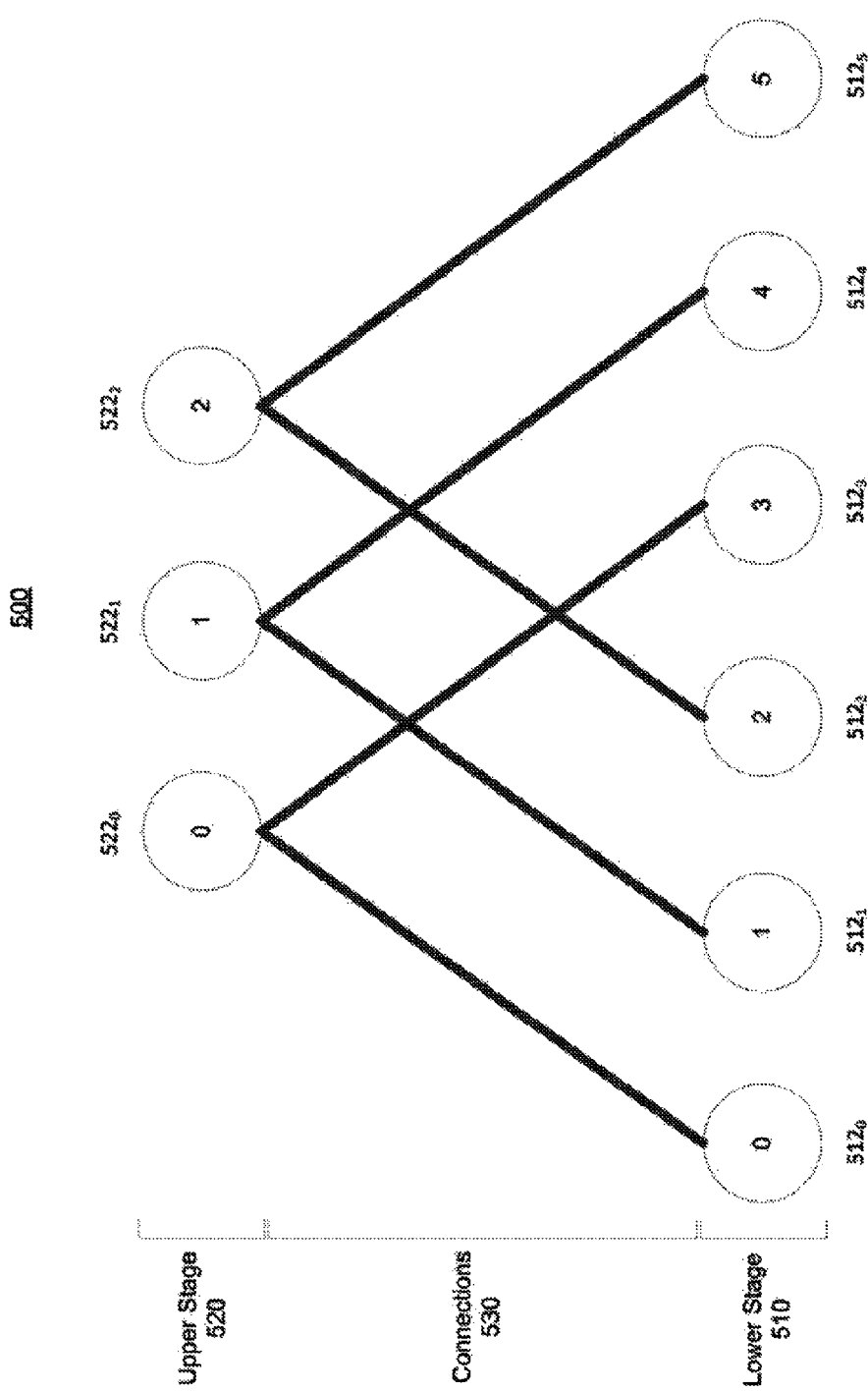
FIG. 5B is a simplified view of the network shown in FIG. 5A, according to an illustrative implementation.

FIG. 5B is a simplified view of the network 500 shown in FIG. 5A, according to an illustrative implementation. All of the single links are removed for illustrative purposes, so that only the interconnectivity slack is visible. Each switch in the lower stage 510 is connected by two links to the switch in the upper stage having the same index, with the exceptions of switches $512_3$, $512_4$, and $512_5$. Because there is no switch with an index value of 3, 4, or 5 in the upper stage 520, the switches with these index values in the lower stage 510 "wrap around" to connect to the upper switches. Therefore, switch $512_3$ connects to switch $522_0$, switch $512_4$ connects to switch $522_1$, and switch $512_5$ connects to switch $522_2$. The network 500 can therefore be said to exhibit rotational symmetry.

FIG. 5C is a matrix 560 representing the connections in the network 500 shown in FIG. 5A, according to an illustrative implementation. Rows in the matrix 560 correspond to index values of switches in the lower stage 510. Columns in the matrix 560 correspond to index values of switches in the upper stage 520. Each cell in the matrix 560 has a value equal to the number of links between the switch pair represented by its row and column index values. Displaying the network 500 in the form of the matrix 560 illustrates that the network 500 exhibits rotational symmetry despite the fact that it is not a square matrix.

Like the matrix 460, the matrix 560 is a circulant matrix in which each row is rotated one element to the right relative to the preceding row. Furthermore, the elements in every diagonal of the matrix 560 have the same value. The diagonals of the matrix 560 that do not contain three consecutive elements "wrap around" without losing their rotational symmetry.

What is claimed is:

1. A computer-implemented method for configuring a network, the method comprising:
   providing a first stage having F switches and a second stage having S switches, wherein: each switch in the first stage of switches can form M communication links with switches in the second stage of switches; and
   each switch in the second stage of switches can form N communication links with switches in the first stage of switches;
   defining a matrix having a number of rows equal to the number of switches in the first stage and a number of columns equal to the number of switches in the second stage;
   assigning values to the matrix such that all elements in each matrix diagonal have the same value;
   assigning a number of communication links between respective switch pairs based on the values of the matrix to achieve a rotational symmetry property amongst the communication link assignments, each switch pair including one switch in the first stage of switches and one switch in the second stage of switches such that the number of communication links assigned to at least one switch pair differs from the number of communication links assigned to at least a second switch pair, wherein:
      the number of communication links between each pair of switches is equal to one of the largest integer not greater than the quotient of M divided by the number of switches in the second stage of switches or the smallest integer not less than the quotient of M divided by the number of switches in the second stage of switches; and
   causing the network to be configured according to the communication link assignments.

2. The method of claim 1, wherein:
   each switch in the first stage has backlogged traffic to all other switches in the first stage, and;
   each switch in the second stage has backlogged traffic to all other switches in the second stage.

3. The method of claim 1, further comprising:
   assigning a sequential integer index number beginning from zero to each switch in the first stage of switches;
   assigning a sequential integer index number beginning from zero to each switch in the second stage of switches;
   determining, for each switch pair, a difference between the index number of the upper switch and the index number of the lower switch;
   determining, for each switch pair, a remainder of a quotient of the difference and the number of switches in the second stage; and
   assigning a number of communication links between respective switch pairs such that all switch pairs having equal remainders are assigned an equal number of communication links.

4. The method of claim 1, wherein the number of switches in the first stage is a multiple of the number of switches in the second stage.

5. A computer-implemented method for configuring a network, the method comprising:
   providing a first stage having F switches and a second stage having S switches, wherein:
      each switch in the first stage can form M communication links with switches in the second stage; and
      each switch in the second stage can form N communication links with switches in the first stage; and
   assigning communication links between switch pairs, wherein:
      each switch pair includes one switch of the first stage and one switch of the second stage;
      a number of communication links assigned to a first switch pair differs from a number of communication links assigned to a second switch pair; and the assignment of communication links achieves a rotational symmetry property such that:
         the communication links can be represented by a matrix having F rows representing the switches in the first stage and S columns representing the switches in the second stage,
         each element in the matrix represents the number of communication links between a switch pair corresponding to the element's row and column, and
         all elements in each matrix diagonal have equivalent values; and
      causing the network to be configured according to the communication link assignments.

6. The method of claim 5, further comprising:
   assigning a sequential integer index number beginning from zero to each switch in the first stage of switches;
   assigning a sequential integer index number beginning from zero to each switch in the second stage of switches;
   determining, for each switch pair, a difference between the index number of the upper switch and the index number of the lower switch;
   determining, for each switch pair, a remainder of a quotient of the difference and the number of switches in the second stage; and
   assigning a number of communication links between respective switch pairs such that all switch pairs having equal remainders are assigned an equal number of communication links.

7. The method of claim 5, wherein the number of switches in the first stage is a multiple of the number of switches in the second stage.

8. A system for configuring a network, the system comprising: a data processing system configured to:
   provide a first stage having F switches and a second stage having S switches, wherein: each switch in the first stage of switches can form M communication links with switches in the second stage of switches; and
   each switch in the second stage of switches can form N communication links with switches in the first stage of switches;
   define a matrix having a number of rows equal to the number of switches in the first stage and a number of columns equal to the number of switches in the second stage;

assign values to the matrix such that all elements in each matrix diagonal have the same value;

assign a number of communication links between respective switch pairs based on the values of the matrix to achieve a rotational symmetry property amongst the communication link assignments, each switch pair including one switch in the first stage of switches and one switch in the second stage of switches such that the number of communication links assigned to at least one switch pair differs from the number of communication links assigned to at least a second switch pair, wherein:

the number of communication links between each pair of switches is equal to one of the largest integer not greater than the quotient of M divided by the number of switches in the second stage of switches or the smallest integer not less than the quotient of M divided by the number of switches in the second stage of switches; and cause the network to be configured according to the communication link assignments.

9. The system of claim 8, wherein:
each switch in the first stage has backlogged traffic to all other switches in the first stage, and;
each switch in the second stage has backlogged traffic to all other switches in the second stage.

10. The system of claim 8, wherein the data processing system is further configured to:
assign a sequential integer index number beginning from zero to each switch in the first stage of switches;
assign a sequential integer index number beginning from zero to each switch in the second stage of switches;
determine, for each switch pair, a difference between the index number of the upper switch and the index number of the lower switch;
determine, for each switch pair, a remainder of a quotient of the difference and the number of switches in the second stage; and
assign a number of communication links between respective switch pairs such that all switch pairs having equal remainders are assigned an equal number of communication links.

11. The system of claim 8, wherein the number of switches in the first stage is a multiple of the number of switches in the second stage.

12. A non-transitory computer readable storage medium having instructions encoded thereon which, when executed by a processor, cause the processor to perform a method for configuring a network that includes a first stage having F switches and a second stage having S switches, and each switch in the first stage can form M communication links with switches in the second stage and each switch in the second stage can form N communication links with switches in the first stage, the method comprising:
assigning communication links between switch pairs, such that:
each switch pair includes one switch of the first stage and one switch of the second stage;
a number of communication links assigned to a first switch pair differs from a number of communication links assigned to a second switch pair; and
the assignment of communication links achieves a rotational symmetry property such that:
the communication links can be represented by a matrix having F rows representing the switches in the first stage and S columns representing the switches in the second stage,
each element in the matrix represents the number of communication links between a switch pair corresponding to the element's row and column, and
all elements in each matrix diagonal have equivalent values; and
causing the network to be configured according to the communication link assignments.

13. The non-transitory computer readable storage medium of claim 12, wherein the method further comprises:
assigning a sequential integer index number beginning from zero to each switch in the first stage of switches;
assigning a sequential integer index number beginning from zero to each switch in the second stage of switches;
determining, for each switch pair, a difference between the index number of the upper switch and the index number of the lower switch;
determining, for each switch pair, a remainder of a quotient of the difference and the number of switches in the second stage; and
assigning a number of communication links between respective switch pairs such that all switch pairs having equal remainders are assigned an equal number of communication links.

14. The non-transitory computer readable storage medium of claim 12, wherein the number of switches in the first stage is a multiple of the number of switches in the second stage.

15. A non-transitory computer readable storage medium having instructions encoded thereon which, when executed by a processor, cause the processor to perform a method for configuring a network, the method comprising:
providing a first stage having F switches and a second stage having S switches, wherein: each switch in the first stage of switches can form M communication links with switches in the second stage of switches; and
each switch in the second stage of switches can form N communication links with switches in the first stage of switches;
defining a matrix having a number of rows equal to the number of switches in the first stage and a number of columns equal to the number of switches in the second stage;
assigning values to the matrix such that all elements in each matrix diagonal have the same value;
assigning a number of communication links between respective switch pairs based on the values of the matrix to achieve a rotational symmetry property amongst the communication link assignments, each switch pair including one switch in the first stage of switches and one switch in the second stage of switches such that the number of communication links assigned to at least one switch pair differs from the number of communication links assigned to at least a second switch pair, wherein:
the number of communication links between each pair of switches is equal to one of the largest integer not greater than the quotient of M divided by the number of switches in the second stage of switches or the smallest integer not less than the quotient of M divided by the number of switches in the second stage of switches; and
causing the network to be configured according to the communication link assignments.

16. The non-transitory computer readable storage medium of claim 15, wherein:
each switch in the first stage has backlogged traffic to all other switches in the first stage, and;

each switch in the second stage has backlogged traffic to all other switches in the second stage.

17. The non-transitory computer readable storage medium of claim 15, wherein the method further comprises:
assigning a sequential integer index number beginning from zero to each switch in the first stage of switches;
assigning a sequential integer index number beginning from zero to each switch in the second stage of switches;
determining, for each switch pair, a difference between the index number of the upper switch and the index number of the lower switch;
determining, for each switch pair, a remainder of a quotient of the difference and the number of switches in the second stage; and
assigning a number of communication links between respective switch pairs such that all switch pairs having equal remainders are assigned an equal number of communication links.

* * * * *

UNITED STATES PATENT AND TRADEMARK OFFICE
CERTIFICATE OF CORRECTION

| | | |
|---|---|---|
| PATENT NO. | : 9,692,639 B1 | Page 1 of 1 |
| APPLICATION NO. | : 13/932703 | |
| DATED | : June 27, 2017 | |
| INVENTOR(S) | : Abdul Kabbani et al. | |

It is certified that error appears in the above-identified patent and that said Letters Patent is hereby corrected as shown below:

On the Title Page

In the Abstract:
Column 2, Line 9 should read as follows:
-- include one switch in the first stage of switches and one --

Signed and Sealed this
First Day of May, 2018

Andrei Iancu
*Director of the United States Patent and Trademark Office*